US008326476B2

(12) United States Patent
Kamaga

(10) Patent No.: US 8,326,476 B2
(45) Date of Patent: Dec. 4, 2012

(54) ELECTRICALLY POWERED VEHICLE

(75) Inventor: Ryuichi Kamaga, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 531 days.

(21) Appl. No.: 12/669,747

(22) PCT Filed: Aug. 15, 2008

(86) PCT No.: PCT/JP2008/064958
§ 371 (c)(1),
(2), (4) Date: Jan. 19, 2010

(87) PCT Pub. No.: WO2009/028400
PCT Pub. Date: Mar. 5, 2009

(65) Prior Publication Data
US 2010/0204859 A1 Aug. 12, 2010

(30) Foreign Application Priority Data
Aug. 31, 2007 (JP) ................................. 2007-226071

(51) Int. Cl.
B60L 9/00 (2006.01)
(52) U.S. Cl. ........................ 701/22; 320/128; 180/65.275
(58) Field of Classification Search .................... 701/22; 180/65.275; 320/104, 128, 132, 155
See application file for complete search history.

(56) References Cited

U.S. PATENT DOCUMENTS

| 5,650,710 | A | 7/1997 | Hotta | |
| 8,091,663 | B2 * | 1/2012 | Ichikawa | 180/65.265 |
| 8,229,616 | B2 * | 7/2012 | Aridome et al. | 701/22 |
| 2007/0278990 | A1 * | 12/2007 | Raichle et al. | 320/104 |
| 2010/0131137 | A1 * | 5/2010 | Iida | 701/22 |
| 2011/0264319 | A1 * | 10/2011 | Chander et al. | 701/22 |
| 2012/0016547 | A1 * | 1/2012 | Aridome et al. | 701/22 |
| 2012/0062168 | A1 * | 3/2012 | Kobayashi et al. | 320/104 |
| 2012/0109443 | A1 * | 5/2012 | Takahashi et al. | 701/22 |

FOREIGN PATENT DOCUMENTS

| DE | 297 07 965 U1 | 8/1997 |
| EP | 1 220 350 A1 | 7/2002 |

(Continued)

OTHER PUBLICATIONS

International Search Report issued in International Application No. PCT/JP2008/064958; Mailed Oct. 21, 2008 (with translation).

(Continued)

Primary Examiner — Helal A Algahaim
(74) Attorney, Agent, or Firm — Oliff & Berridge, PLC

(57) ABSTRACT

In a vehicle, a power storage device starts to be charged at a set time. An electric power control unit monitors a charging/discharging device from startup of the charging/discharging device to the moment when charging starts. When the electric power control unit detects a problem in the charging/discharging device, a signal is sent to a timer control unit in order to cancel setting of the charging start time. When receiving the signal, the timer control unit cancels the setting. Specifically, even when the present time reaches the charging start time, the timer control unit does not transmits a signal for canceling the setting of the charging start time, i.e., a start instruction to the electric power control unit. The electric power control unit never allows operation of the charging/discharging device to start unless it receives the signal, so the charging/discharging device remains stopped.

4 Claims, 11 Drawing Sheets

FOREIGN PATENT DOCUMENTS

| | | |
|---|---|---|
| JP | A-6-343202 | 12/1994 |
| JP | A-6-343204 | 12/1994 |
| JP | A-7-46768 | 2/1995 |
| JP | A-7-107618 | 4/1995 |
| JP | A-7-123599 | 5/1995 |
| JP | A-8-336236 | 12/1996 |
| JP | A-9-233720 | 9/1997 |
| JP | A-11-122825 | 4/1999 |

OTHER PUBLICATIONS

Extended European Search Report issued in European Application No. EP 08 79 2629 dated Jun. 24, 2011.

* cited by examiner

ELECTRICALLY POWERED VEHICLE

TECHNICAL FIELD

The present invention relates to an electrically powered vehicle, in particular, an electrically powered vehicle that can be charged by an external power source.

BACKGROUND ART

Electrically powered vehicles each have a power storage device (for example, a secondary battery, a capacitor, or the like) mounted thereon, and travel using driving force generated from electric power stored in the power storage device. The electrically powered vehicles include, for example, an electric vehicle, a hybrid vehicle, a fuel cell vehicle, and the like.

In recent years, a technique has been proposed to charge the power storage device mounted on each of such vehicles, using a commercial electric power source with high power generation efficiency. It can be expected that the use of such a technique achieves increased fuel consumption efficiency of a hybrid vehicle, for example. Drawing attention in particular is a technique that employs a commercial electric power source provided at each home (for example, a supply source of relatively low voltage such as 100 V or 200 V) in order to charge the power storage device mounted on the electrically powered vehicle.

For a user who uses the electrically powered vehicle that can be charged by the commercial electric power source, it is more preferable if a fee for an amount of electric power required in charging the power storage device is cheaper. If fee for usage of electric power in midnight is cheaper than that in daytime, expenses for charging can be reduced by, for example, charging the power storage device of the electrically powered vehicle during a period of midnight power.

However, depending on the user's circumstances, it may be difficult to perform operations for charging the electrically powered vehicle in midnight. For example, if the user uses the electrically powered vehicle in daytime and has to wait until midnight to start the operations of charging, the user is likely to suffer from an increased burden. A way considered and utilized to solve such a problem is to start charging the power storage device of the vehicle at charging start time designated by the user.

For example, Japanese Patent Laying-Open No. 7-123599 discloses a charging control device for securely charging a power storage device at charging start time in the way described above. The charging control device checks for problems in the charging system at the moment when the timer is set, and outputs a warning if the charging system has a problem. With this, inexecution of the charging by the problem having existed when the timer was set, can be prevented after the start of charging.

Japanese Patent Laying-Open No. 7-123599 discloses that the charging control device checks for problems at the moment when the timer starts to measure time and at the moment when the timer ends the measurement. However, it never discloses a specific process of the control device when a problem (such as electric power failure) occurs during a period of time from the moment of starting the time measurement to the moment of ending it. In such a case, it is considered that the problem is not detected until the timer ends the time measurement. If the problem in the charging system remains, adverse effects are concerned over not only the charging device but also the vehicle.

DISCLOSURE OF THE INVENTION

An object of the present invention is to provide an electrically powered vehicle that can be charged by an external power source and can detect an abnormality in its charging system quickly.

In summary, the present invention provides an electrically powered vehicle chargeable by an external power source. The electrically powered vehicle includes a power storage device, a charging device, a start time setting unit, a start instructing unit, a charging control unit, and an abnormality monitoring unit. The power storage device stores electric power used to generate driving force of the electrically powered vehicle. The charging device charges the power storage device using electric power supplied from the external power source. The start time setting unit receives at least one of programmed start time and programmed end time and sets charging start time. The start instructing unit outputs a start instruction to start to charge the power storage device, when the present time reaches the charging start time set by the start time setting unit. The charging control unit starts up the charging device in response to the start instruction. The abnormality monitoring unit monitors for an abnormality in the charging device when the startup of the charging device at the charging start time has been set. The problem monitoring unit causes the start instructing unit to stop the output of the start instruction when the abnormality is detected in the charging device.

Preferably, the abnormality monitoring unit monitors for a problem in the charging device, during a period of time from a moment at which the startup of the charging device at the charging start time has been set to the charging start time.

When the startup of the charging device at the charging start time is instructed, the start instructing unit causes the abnormality monitoring unit to determine whether or not supply of the electric power from the external power source to the charging device is normal. When the abnormality monitoring unit determines that the supply of the electric power is normal, the start instructing unit starts determination as to whether or not the present time has reached the charging start time.

Preferably, the electrically powered vehicle further includes a notifying unit for notifying the abnormality in the charging device. When the abnormality monitoring unit detects the problem in the charging device, the abnormality monitoring unit causes the notifying unit to notify the problem in the charging device.

Preferably, the electrically powered vehicle further includes a notifying unit for notifying the abnormality in the charging device. When the problem monitoring unit detects the problem in the charging device, the problem monitoring unit causes the notifying unit to notify the abnormality in the charging device in response to startup of the electrically powered vehicle.

Thus, according to the present invention, an abnormality can be detected quickly which occurs in the charging system of the electrically powered vehicle having the power storage device chargeable by the external power source.

BEST MODES FOR CARRYING OUT THE INVENTION

Figure 1:
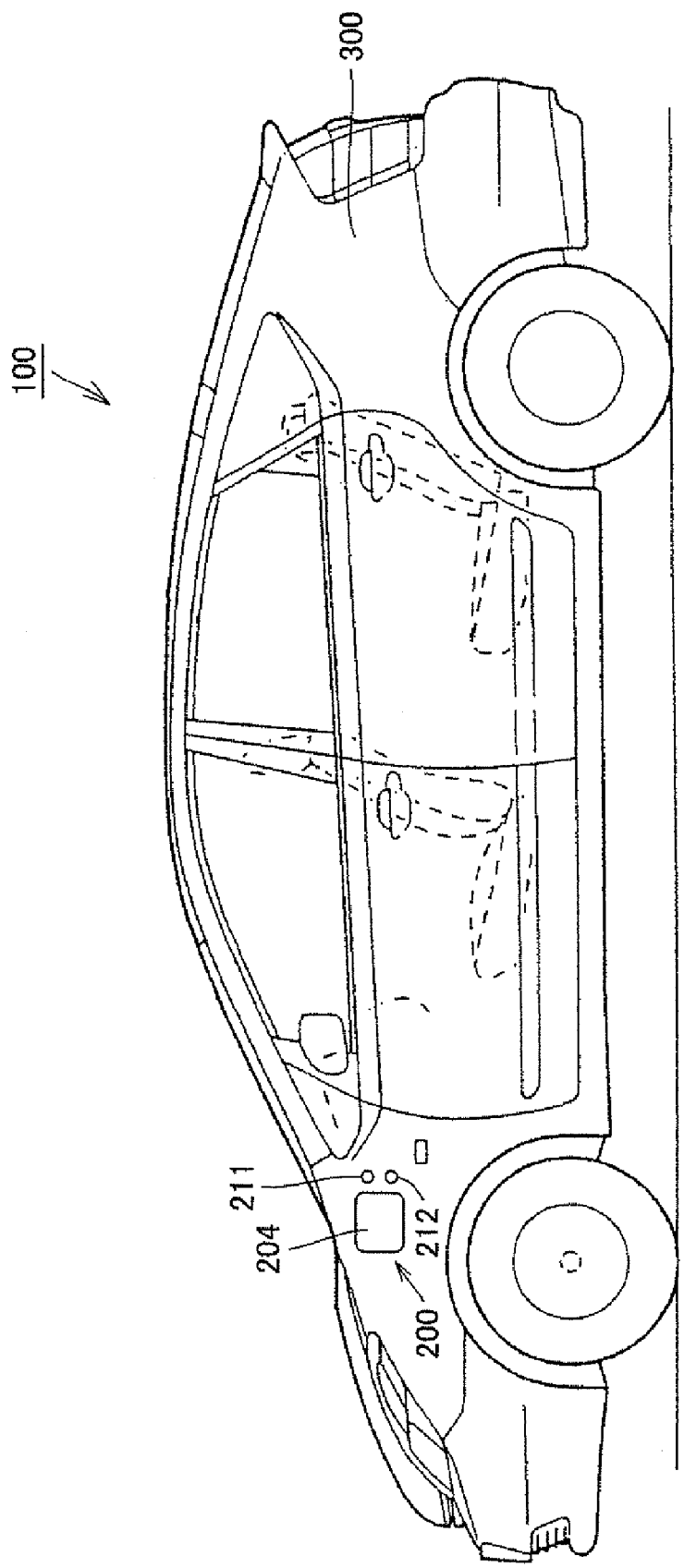
FIG. 1 is a side view of a vehicle 100 according to an embodiment of the present invention.

An embodiment of the present invention will be described below with reference to figures. It should be noted that the same or equivalent portions in the figures will be given the same reference characters, and explanation therefor are not repeated.

In the embodiment of the present invention, a hybrid vehicle is exemplified as an electrically powered vehicle that can be charged by an external power source. However, the electrically powered vehicle that can be charged by an external power source is not limited to a hybrid vehicle and may be, for example, an electric vehicle.

A vehicle 100 according to the embodiment of the present invention has an internal combustion engine (engine), a power storage device, and a motor driven to rotate by means of electric power supplied from the power storage device. Driving force generated through the internal combustion engine and the motor is distributed optimally, thereby realizing high fuel consumption efficiency. In addition, the power storage device mounted on vehicle 100 can be charged by electric power from the external power source (as one example, a commercial electric power source).

1. Configuration of the Vehicle According to the Embodiment of the Present Invention FIG. 1 is a side view of vehicle 100 according to the embodiment of the present invention. Referring to FIG. 1, a vehicular main body (body) 300 is provided with a charging inlet 200. Charging inlet 200 is provided with a connector (not shown in FIG. 1) connected to a cable that transfers electric power supplied from a commercial electric power source, and a cover 204 for preventing water, dusts, and the like from entering the connector. FIG. 1 shows a configuration in which charging inlet 200 is formed adjacent to a front wheel in the left lateral side of vehicular main body 300. It should be noted that a location in which charging inlet 200 is formed is not particularly limited.

In vehicle 100, when the cable is connected to the connector, charging of the power storage device can be started. In vehicle 100, charging of the power storage device can be started at time set in advance. Such charging of the power storage device started at the time set in advance is hereinafter referred to as "timer charging".

In the vicinity of charging inlet 200, lamps 211, 212 are provided. Where a user sets timer charging for vehicle 100, lamp 211 illuminates during a period of time from the moment at which the timer charging has been set to the time of starting the charging. This allows the user to confirm that the timer charging has been set correctly. When the present time reaches the charging start time, lamp 211 is put off.

Lamp 212 illuminates upon the start of the charging of the power storage device, and is put off when the charging ends. Where the timer charging is set, lamp 212 illuminates when the present time reaches the charging start time. This allows the user to confirm that the power storage device is being charged.

In addition, in the vehicular main body (body) of vehicle 100 according to the present embodiment, a fuel inlet (not shown) is formed to provide fuel required for operations of the internal combustion engine.

Figure 2:
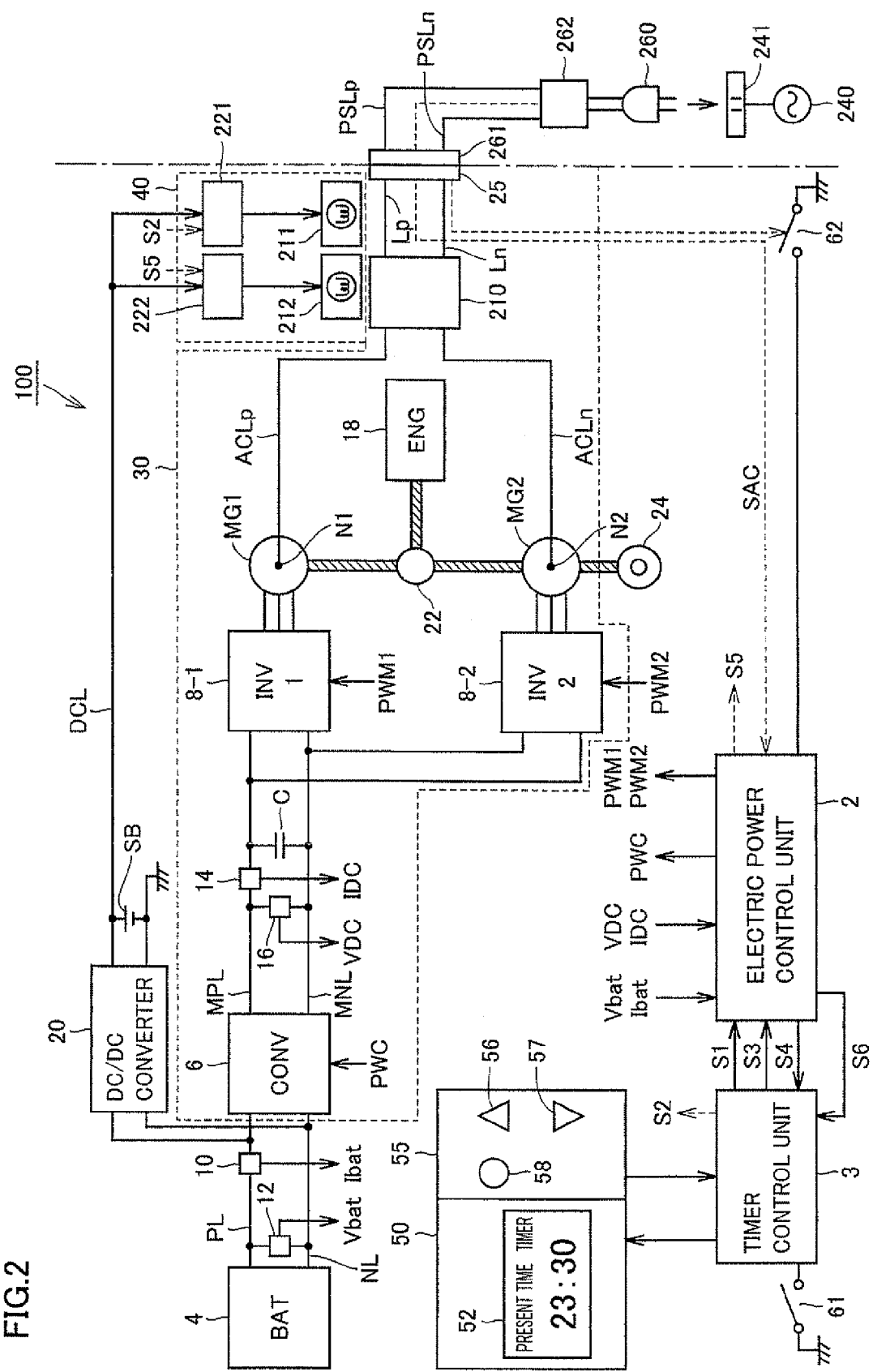
FIG. 2 is a schematic diagram of a configuration of vehicle 100.
Figure 3:
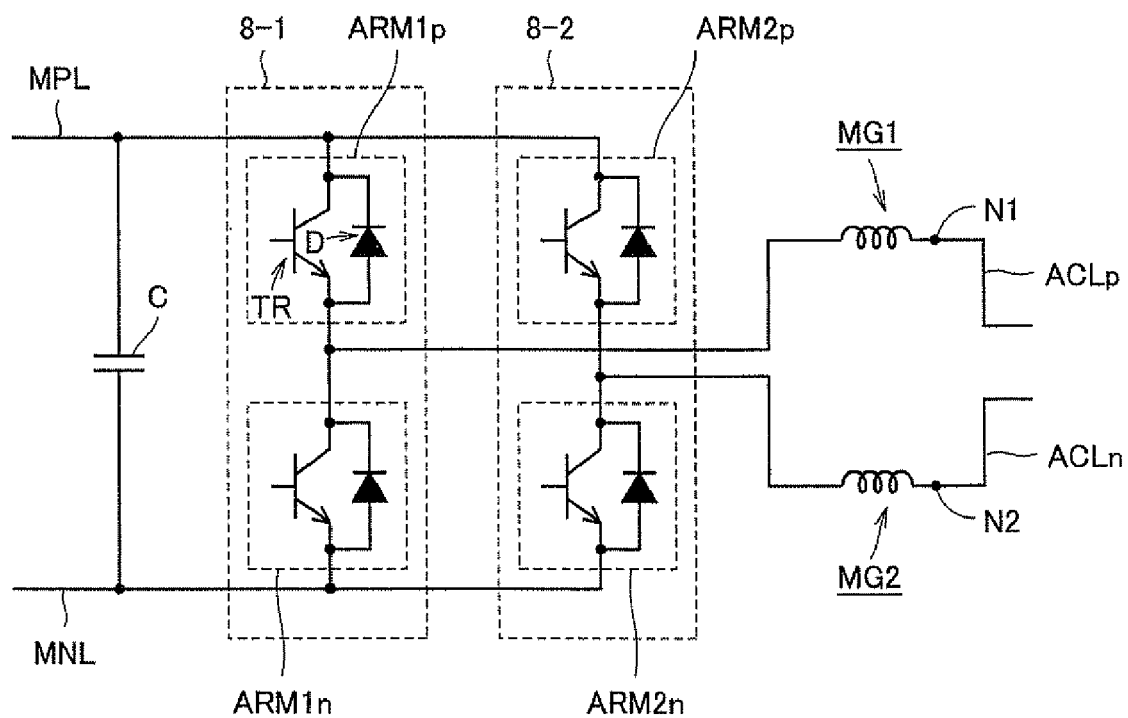
FIG. 3 shows a zero phase equivalent circuit of inverters 8-1, 8-2 and motor generators MG1, MG2 during a zero phase mode.

Referring to FIG. 2 and FIG. 3, the configuration of vehicle 100 will be described more in detail below.

FIG. 2 is a schematic diagram of the configuration of vehicle 100. Referring to FIG. 2, vehicle 100 is a hybrid vehicle of parallel/series type. Vehicle 100 includes: a power storage device (BAT) 4 storing electric power for generating driving force; a charging/discharging device 30 for charging and discharging power storage device 4; an electric power control unit 2 for controlling charging/discharging device 30; a timer control unit 3 for implementing the timer charging; a lighting device 40; a display unit 50 for displaying the start time of the timer charging; an input unit 55 via which a user inputs programmed start time of the timer charging; and switches 61, 62.

Power storage device 4 is an electric power storage element configured to be chargeable and dischargeable. Power storage device 4 is constituted by, for example, a secondary battery such as a lithium ion battery or a nickel hydrogen battery, or a power storage element such as an electric double layer capacitor.

Charging/discharging device 30 includes a converter (CONV) 6, a main positive bus line MPL, a main negative bus line MNL, a capacitor C, a first inverter (INV1) 8-1, a second inverter (INV2) 8-2, a motor generator MG1, and a motor generator MG2.

Converter 6 mutually converts input/output voltage of power storage device 4 into voltage between main positive bus line MPL and main negative bus line MNL. The voltage conversion performed by converter 6 is controlled according to a switching command PWC from electric power control unit 2.

Capacitor C smoothens voltage between main positive bus line MPL and main negative bus line MNL. Inverters 8-1, 8-2 are provided so as to correspond to motor generators MG1, MG2. Inverters 8-1, 8-2 are electrically connected to power storage device 4 in parallel. Each of inverters 8-1, 8-2 mutually converts direct-current power into alternating-current power.

Charging/discharging device 30 further includes a charging connector 25, an AC port 210, and power lines Lp, Ln, ACLp, ACLn.

AC port 210 electrically connects power line Lp and power line ACLp, and electrically connects power line Ln and power line ACLn. AC port 210 is connected to charging connector 25 via power lines Lp, Ln. AC port 210 is connected to a neutral point N1 of motor generator MG1 and a neutral point N2 of motor generator MG2 through power lines ACLp and ACLn.

Each of motor generators MG1 and MG2 includes a stator in which a U-phase coil, a V-phase coil, and a W-phase coil form a Y-connection (star connection). The Y-connections have points at each of which the three coils are connected. The points correspond to neutral point N1 of motor generator MG1 and neutral point N2 of motor generator MG2.

When charging power storage device 4 is charged by means of external power source 240, electric power is transferred from external power source 240 to vehicle 100 via the charging cable. The charging cable includes power lines PSLp, PSLn, and plugs 260, 261.

Plug 260 is connected to a connector 241 electrically coupled to external power source 240. Plug 261 is connected to charging connector 25. This allows power lines PSLp, Lp, ACLp to be electrically connected, and allows power lines PSLn, Ln, ACLn to be electrically connected.

When plug 261 is connected to charging connector 25, switch 62 is turned on. Switch 62 is, for example, a mechanical switch having a fixed contact and a movable contact. When switch 62 is turned on, electric power control unit 2 is fed with predetermined voltage (ground voltage in the configuration of FIG. 2). Accordingly, electric power control unit 2 detects that plug 261 has been brought into connection with charging connector 25.

A voltage value and a type (direct current or alternating current) of the electric power supplied from external power source 240 are not particularly limited. For example, a commercial electric power source provided at each home can be used as external power source 240. In the present embodiment, external power source 240 is a commercial electric power source of single-phase alternating current (its voltage value is 100 V or 200 V). Control device 262 outputs a signal SAC including information indicating the voltage value of the electric power supplied from external power source 240, the current capacity thereof, and the like. Signal SAC passes through a signal line (not shown) within the charging cable as well as a signal line (not shown) provided between charging connector 25 and electric power control unit 2, and is delivered to electric power control unit 2. Based on the information included in signal SAC for example, electric power control unit 2 detects that the electric power is being supplied from external power source 240.

The electric power of the external power source is supplied to neutral points N1, N2 of motor generators MG1, MG2, thereby applying the voltage of power line PSLp to each of the phases in the alternating-current side of inverter 8-1 and applying the voltage of power line PSLn to each of the phases of the alternating-current side of inverter 8-2. Inverters 8-1, 8-2 perform switching operations in response to switching commands PWM1, PWM2 respectively. Accordingly, direct-current power having a predetermined voltage value is supplied from each of inverters 8-1, 8-2 to each of main positive bus line MPL and main negative bus line MNL.

More specifically, each of inverters 8-1, 8-2 has three arm circuits respectively corresponding to the three phases of the alternating-current side. Each arm circuit includes an upper arm circuit and a lower arm circuit each having at least one switching element.

In each of inverters 8-1, 8-2, the upper arm circuits respectively corresponding to the phases are collectively turned on/off, and the lower arm circuits respectively corresponding to the phases are also collectively turned on/off. Accordingly, it can be regarded that in each of inverters 8-1, 8-2, the three upper arm circuits are in the same switching state (all of them are on or off). Similarly, it can be regarded that the three lower arm circuits are in the same switching state. Such switching operations render their respective phase voltages equal to one another. In addition, such a switching mode is also referred to as "zero phase mode".

FIG. 3 shows a zero phase equivalent circuit of inverters 8-1, 8-2 and motor generators MG1, MG2 during the zero phase mode. Referring to FIG. 3, when inverters 8-1, 8-2 perform switching operations in accordance with the above-described zero phase mode, the three upper arm circuits in inverter 8-1 can be collectively represented as an upper arm ARM1$p$, whereas the three lower arm circuits in inverter 8-1 are collectively represented as a lower arm ARM1$n$. Each of upper arm ARM1$p$ and lower arm ARM1$n$ is constituted by a switching element TR and a free wheel diode D. Likewise, the three upper arm circuits in inverter 8-2 can be collectively represented as an upper arm ARM2$p$, whereas the three lower arm circuits in inverter 8-2 can be collectively represented as a lower arm ARM2$n$.

The zero phase equivalent circuit shown in FIG. 3 can be regarded as a single-phase inverter that is capable of converting direct-current power, which is supplied through main positive bus line MPL and main negative bus line MNL, into single-phase alternating-current power, and capable of converting single-phase alternating-current power, which is sent to neutral points N1 and N2 via power lines ACLp, ACLn, into direct-current power.

In other words, inverters 8-1, 8-2 are controlled to realize the zero phase mode, thus allowing inverters 8-1, 8-2 to operate equivalently as a single-phase inverter. Accordingly, the single-phase alternating-current power supplied from external power source 240 can be converted into direct-current power, and the direct-current power can be supplied to main positive bus line MPL and main negative bus line MNL. The direct-current power charges power storage device 4.

Referring to FIG. 2 again, charging/discharging device 30 further includes internal combustion engine ENG and a power splitting mechanism 22. Internal combustion engine ENG operates by means of combustion of fuel. Motor generator MG1 can receive a part of motive power from internal combustion engine ENG to generate electric power. Motor generator MG2 operates as a motor, using electric power from power storage device (BAT) 4.

Internal combustion engine ENG and motor generators MG1, MG2 are mechanically coupled to one another via power splitting mechanism 22. Power splitting mechanism 22 is typically constituted by a planetary gear mechanism.

During traveling of vehicle 100, charging/discharging device 30 functions as a device that generates driving force for the vehicle. In response to switching command PWM1 from electric power control unit 2, inverter 8-1 mainly converts alternating-current power generated by motor generator MG1, into direct-current power. In response to switching command PWM2 from electric power control unit 2, inverter 8-2 converts direct-current power supplied via main positive bus line MPL and main negative bus line MNL, into alternating-current power, and supplies the converted alternating-current power to motor generator MG2. Power splitting mechanism 22 splits in two driving force resulting from operations of internal combustion engine ENG, and distributes a part of it to the motor generator MG1 side and distributes the rest to motor generator MG2.

The driving force distributed from power splitting mechanism 22 to motor generator MG1 is used for electric power generating operations. Electric power generated by motor generator MG1 is used to charge power storage device 4, and is used for generation of driving force by motor generator MG2. The driving force distributed to motor generator MG2 is combined with driving force generated by motor generator MG2, and is used for driving of driving wheel 24.

It should be noted that the number of power storage devices and the capacity thereof are not particularly limited. For example, a plurality of power storage devices may be mounted on vehicle 100. Where power storage devices 4 are charged by external power source 240, power storage devices 4 can be sufficiently charged. In this case, the vehicle can travel using only driving force, generated by motor generator MG2, with internal combustion engine ENG maintained at the stop state, i.e., the vehicle achieves EV (Electric Vehicle) traveling. For example, as the number of power storage devices is increased, more electric power can be stored, thus allowing the vehicle to perform EV traveling for a longer distance.

Each of electric power control unit 2 and timer control unit 3 is, for example, an ECU (Electronic Control Unit) including a CPU (Central Processing Unit), a RAM (Random Access Memory), a ROM (Read Only Memory), and an input/output interface unit.

Electric power control unit 2 controls charging/discharging device 30 based on information from current sensors 10, 14 and voltage sensors 12, 16. Current sensor 10 detects current Ibat, which is current flowing in power line PL (current sent to/received from power storage device 4). Voltage sensor 12 detects voltage Vbat between power lines PL, NL. Current sensor 14 detects current IDC flowing in main positive bus line MPL. Voltage sensor 16 detects voltage VDC between main positive bus line MPL and main negative bus line MNL. Electric power control unit 2 receives the values of current Ibat, IDC and the values of voltage Vbat, VDC, and outputs switching commands PWM1, PWM2, PWC.

When the present time reaches the charging start time designated by the user, timer control unit 3 instructs electric power control unit 2 to control charging/discharging device 30.

Display unit 50 includes a display screen 52. Display screen 52 displays the start time of the timer charging (the start time designated by the user) or the present time.

Input unit 55 includes operation buttons 56-58. When the user presses operation buttons 56, 57, the charging start time or present time displayed on display screen 52 is changed. When the user presses operation button 58, the charging start time displayed on display screen 52 is input to timer control unit 3 or the time displayed on display screen 52 is confirmed as the present time.

Connected to timer control unit 3 is switch 61. For example, as with switch 62, switch 61 is a mechanical switch. When the user presses switch 61, timer control unit 3 is fed with predetermined voltage (ground voltage in the configuration of FIG. 2). This causes timer control unit 3 to detect that the user has set the timer charging. In response, timer control unit 3 sends electric power control unit 2 a signal S1 indicating that the timer charging has been requested by the user.

In response to signal S1, electric power control unit 2 determines whether to permit the timer charging. Then, electric power control unit 2 sends timer control unit 3 a signal S4 indicating the result of the determination. After sending signal S4, electric power control unit 2 is brought into the standby state (sleep mode). This reduces electric power consumed by electric power control unit 2 until the start of the charging of power storage device 4.

If the information included in signal S4 indicates that electric power control unit 2 has permitted the timer charging, timer control unit 3 outputs a signal S2. When the present time reaches the charging start time set by the user, timer control unit 3 outputs a signal S3 to electric power control unit 2 in order to start up electric power control unit 2. In response to signal S3, electric power control unit 2 operates charging/discharging device 30 to charge power storage device 4. In addition, electric power control unit 2 outputs a signal S5.

Vehicle 100 further includes a DC/DC converter 20 and an auxiliary battery SB. DC/DC converter 20 is electrically connected to power storage device 4 in parallel with converter 6, DC/DC converter 20 steps down the voltage of electric power discharged from power storage device 4, to generate auxiliary electric power. The voltage of the auxiliary electric power is set lower (for example, 12 V or 24 V) than the charge/discharge voltage of the power storage device (for example, 288 V).

The auxiliary electric power generated by DC/DC converter 20 is supplied to various auxiliary devices (not shown) of vehicle 100 via a power line DCL. A part of the auxiliary electric power is supplied to an auxiliary battery SB. Auxiliary battery SB stores the auxiliary electric power.

Auxiliary battery SB allows the auxiliary electric power to be supplied to each of the auxiliary devices even when vehicle 100 is in the resting state (ignition-off state). The electric power stored in auxiliary battery SB is supplied to, for example, electric power control unit 2, timer control unit 3, and lighting device 40.

Auxiliary battery SB is charged by, for example, external power source 240, as with power storage device 4. For example, power storage device 4 and auxiliary battery SB can be charged by operating DC/DC converter 20 while power storage device 4 is being charged.

Lighting device 40 includes lamps 211, 212, and driving devices 221, 222 for respectively driving lamps 211, 212. Each of lamps 211, 212 is, for example, an LED (light-emitting diode). By using an LED for each of lamps 211, 212, electric power consumption can be reduced. Further, since an LED emits light having relatively high directivity, the user can readily determine whether or not each of lamps 211, 212 illuminates. Namely, when the user is away from vehicle 100, he/she can readily determine the state of power storage device 4 (whether power storage device 4 is being charged, power storage device 4 is before being charged, or the like).

Lamps 211, 212 respectively emit, for example, green-colored light and red-colored light. Since lamps 211, 212 emit light of different colors as such, the user can readily recognize that either lamp 211 or 212 illuminates.

Driving device 221 drives lamp 211 in response to signal S2. Likewise, driving device 222 drives lamp 212 in response to signal S5.

Electric power control unit 2 continues monitoring of charging/discharging device 30 from the moment at which the timer charging has been set (moment at which the startup of charging/discharging device 30 at the charging start time has been set) to the start of the charging. If electric power control unit 2 detects an abnormality in charging/discharging device 30, electric power control unit 2 sends a signal S6 to timer control unit 3 in order to cancel the setting of the timer charging.

When receiving signal S6, timer control unit 3 cancels the setting of the charging start time. Specifically, timer control unit 3 does not send signal S3 (start instruction) to electric power control unit 2 even when the present time reaches the charging start time. Electric power control unit 2 never starts the operation of charging/discharging device 30 unless it receives signal S3, so charging/discharging device 30 remains stopped.

Thus, according to the present embodiment, when an abnormality occurs in the charging system (including charging/discharging device 30, the charging cable, and external power source 240) during a period of time from the moment at which the timer charging has been set to the charging start time, the abnormality can be detected immediately. Further, according to the present embodiment, when an abnormality occurs, the charging/discharging device 30 remains stopped. This can reduce adverse effects on the charging system and the vehicle.

Figure 4:
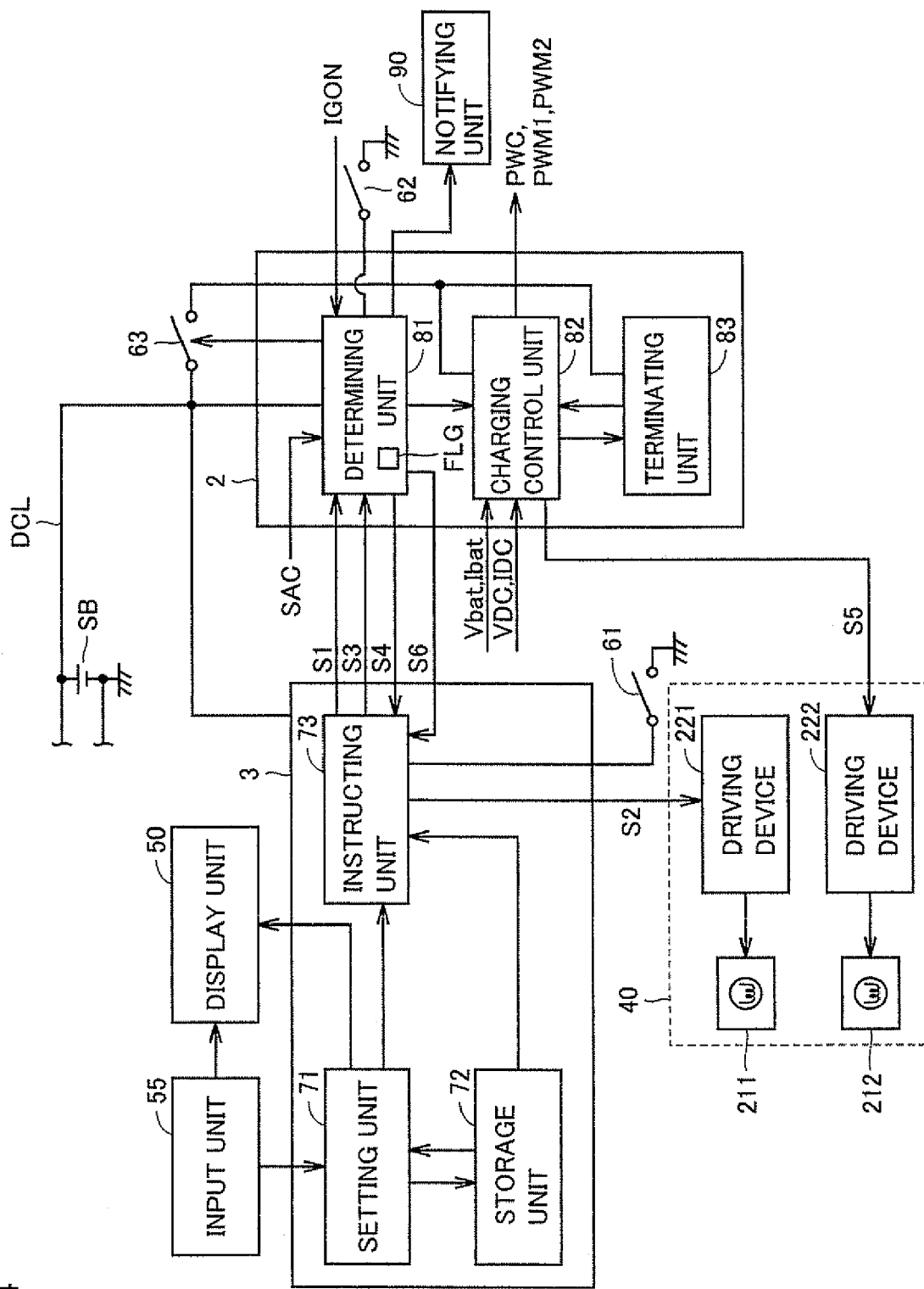
FIG. 4 is a functional block diagram of an electric power control unit 2 and a timer control unit 3.

FIG. 4 is a functional block diagram of electric power control unit 2 and timer control unit 3. Referring to FIG. 4, timer control unit 3 includes a setting unit 71, a storage unit 72, and an instructing unit 73. Electric power control unit 2 includes a determining unit 81, a charging control unit 82, and a terminating unit 83. Note that determining unit 81 corresponds to an "abnormality monitoring unit" in the present invention.

Timer control unit 3 and electric power control unit 2 operate using electric power supplied from auxiliary battery SB. Determining unit 81 controls a switch 63 that switches to supply electric power to charging control unit 82 and terminating unit 83 and to stop supplying the electric power supply. When switch 63 is turned off, charging control unit 82 and terminating unit 83 are stopped.

Setting unit 71 sets charging start time. When the user presses operation button 56 of input unit 55 (see FIG. 2), an instruction of putting the charging start time forward is sent from input unit 55 to setting unit 71. When the user presses operation button 57 of input unit 55 (see FIG. 2), an instruction of putting the charging start time backward is sent from input unit 55 to setting unit 71. In response to these instructions, setting unit 71 puts the charging start time backward or forward. When the user presses operation button 58 of input unit, 55 (see FIG. 2), setting unit 71 sets the charging start time.

On storage unit 72, the charging start time thus set by setting unit 71 is recorded.

When it is detected that switch 61 is pressed by the user, instructing unit 73 acquires information of the charging start time from storage unit 72. Instructing unit 73 transmits to determining unit 81 signal S3 representing the request for timer charging. In response to signal S3, determining unit 81 determines whether to permit the timer charging. Specifically, determining unit 81 detects whether or not switch 62 is on. If switch 62 is in the on state, it means that the charging cable is connected to the charging connector. Further, determining unit 81 receives signal SAC and determines whether or not alternating-current power has been delivered from external power source 240 to charging connector 25. Based on the results of the determinations, determining unit 81 sends instructing unit 73 signal S4 indicating that the timer charging is permitted or not.

After transmitting signal S4, determining unit 81 turns off switch 63.

Instructing unit 73 receives signal S4 and determines whether or not the timer charging is permitted. If the timer charging is permitted, instructing unit 73 acquires the information of the charging start time from storage unit 72. Further, instructing unit 73 sends signal S2 to driving device 221. In response to signal S2, driving device 221 causes lamp 211 to illuminate.

When the present time reaches the charging start time, instructing unit 73 transmits signal S3 to determining unit 81. In response to signal S3, determining unit 81 turns on switch 63. This starts up charging control unit 82 and terminating unit 83. During a period of time from the moment at which the timer charging has been set to the moment of starting the charging of the power storage device, charging control unit 82 and terminating unit 83 are stopped. Hence, during this period, electric power consumption of electric power control unit 2 can be reduced. Further, instructing unit 73 causes driving device 221 to stop the operation of lamp 211.

When electric power is supplied from auxiliary battery SB, charging control unit 82 starts charging/discharging device 30. In addition, charging control unit 82 sends signal S5 to driving device 222. In response to signal S5, driving device 222 causes lamp 212 to illuminate.

Based on current Ibat and voltage Vbat, charging control unit 82 calculates a value indicating a state of charge of power storage device 4, and outputs the value thereof to terminating unit 83. Based on the value indicating the state of charge of power storage device 4, terminating unit 83 determines whether or not a charging end condition of power storage device 4 is satisfied. When the charging end condition is satisfied, terminating unit 83 instructs charging control unit 82 to end the operation of charging/discharging device 30. In response to the instruction from terminating unit 83, charging control unit 82 stops charging/discharging device 30, and causes driving device 222 to stop the operation of lamp 212.

Terminating unit 83 may calculate, based on current Ibat and voltage Vbat, the value indicating the state of charge of power storage device 4, and may determine based on the value whether or not the charging end condition of power storage device 4 is satisfied.

When determining unit 81 determines that there has occurred an abnormality in the charging system (detects an abnormality), it sends signal S6 to instructing unit 73. When receiving signal S6, instructing unit 73 cancels the setting of the charging start time. When determining that there has occurred the abnormality in the charging system, determining unit 81 turns on a flag FLG stored therein, and sends an instruction to a notifying unit 90 to notify the user of the abnormality in the charging system. Upon receiving the instruction from determining unit 81, notifying unit 90 performs a process to notify the user of the abnormality in the charging system.

A way of notification by notifying unit 90 is not particularly limited. Notifying unit 90 may be a device that lights up a display light representing an abnormality in the charging system, or may be a device that emits a sound to notify the user of an abnormality in the charging system.

Determining unit 81 is always supplied with electric power from auxiliary battery SB. Therefore, once flag FLG is turned on, it is maintained at the on state. This allows determining unit 81 to send an instruction to notifying unit 90 at any timing.

2. Timer Charging Process and Problem Monitoring

A flow of the timer charging process will be described with reference to FIG. 5 and FIG. 6. It should be noted that the description below assumes that when a signal is at the H (logic high) level, its logic is enabled. In addition, a state in which a signal is switched from the L (logic low) level to the H level corresponds to a state at which the signal is transmitted.

Figure 5:
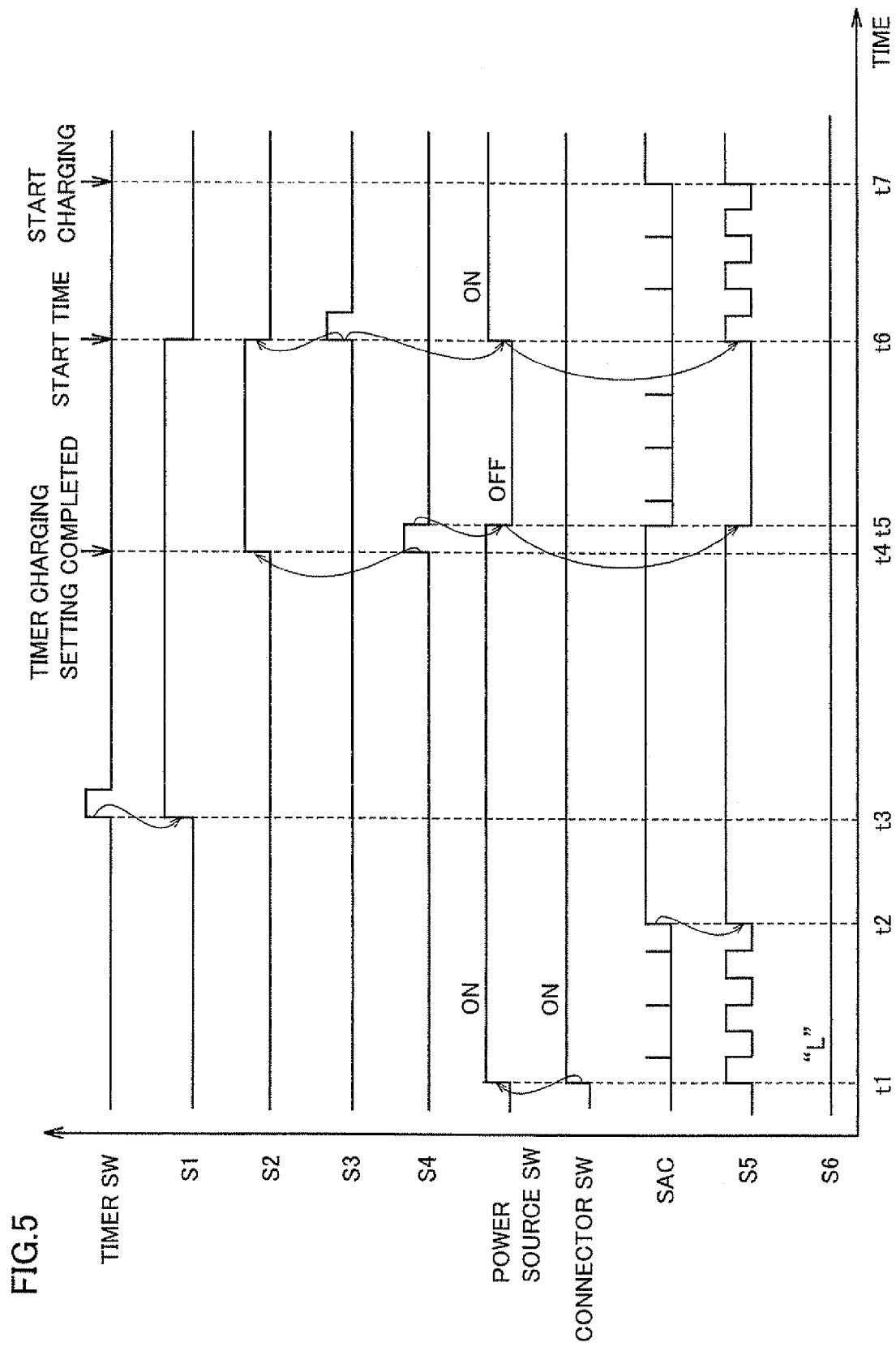
FIG. 5 is a first timing chart illustrating operations of electric power control unit 2 and timer control unit 3.

FIG. 5 is a first timing chart illustrating operations of electric power control unit 2 and timer control unit 3. FIG. 5 shows a flow of the timer charging process performed when the charging cable is first connected to the charging connector and then the user presses switch 61.

Referring to FIG. 5 and FIG. 4, at time t1, switch 62 (connector SW) is turned on. In other words, the charging cable is connected to charging connector 25. In response, determining unit 81 turns on switch 63 (power source SW). Accordingly, the electric power stored in auxiliary battery SB is supplied to charging control unit 82, thus starting up charging control unit 82. Further, determining unit 81 receives signal SAC for every fixed time and determines a state of supply of electric power from external power source 240. FIG. 5 shows a state in which duration of signal SAC is short and signal SAC is repeatedly generated. Namely, FIG. 5 shows a state in which determining unit 81 receives signal SAC for every fixed time.

When determining unit 81 determines that the supply of electric power from external power source 240 is normal (for example, external power source 240 is not in failure), it sends, at time t2, an instruction to charging control unit 82 in order to start up charging/discharging device 30. Charging control unit 82 receives the instruction, and starts to control charging/discharging device 30. In this way, charging of power storage device 4 is started.

Charging control unit 82 repeatedly varies signal S5 until it receives the instruction for starting up charging/discharging device 30. This causes lamp 212 to blink.

At time t2, charging control unit 82 changes the level of signal S5 from the L level to the H level. This causes lamp 212 to illuminate.

While power storage device 4 is being charged, the level of signal SAC is maintained at the H level.

Then, when the user presses switch 61 (timer SW) at time t3, signal S1 rises to the H level and determining unit 81 starts determination as to whether to permit the timer charging. Note that power storage device 4 keeps on being charged.

At time t4, in order to inform instructing unit 73 of permission of the timer charging, determining unit 81 changes the level of signal S4 from the L level to the H level. In response to signal S4, instructing unit 73 changes the level of signal S2 from the L level to the H level. In response to signal S2, driving device 221 causes lamp 211 to illuminate.

At time t4, the setting for the timer charging is completed. At time t5, instructing unit 73 changes the level of signal S4 from the H level to the L level. In response, determining unit 81 turns off switch 63 (power source SW). This interrupts the supply of electric power from auxiliary battery SB to charging control unit 82, thereby stopping charging control unit 82. At time t5, the charging of power storage device 4 is once terminated and lamp 212 is put out.

After time t5, determining unit 81 monitors for presence/absence of an abnormality in the charging system. As long as the charging system is normal, the level of signal S6 is kept at the L level.

Time t6 corresponds to the charging start time set by the user. At time t6, instructing unit 73 changes the level of signal S3 from the L level to the H level. In response to signal S3, determining unit 81 turns on switch 63 (power source SW). Accordingly, the electric power stored in auxiliary battery SB is supplied to charging control unit 82, thus starting up charging control unit 82. During a period of time from time t6 to time t7, charging control unit 82 performs a process similar to the process performed during the period of time from time t1 to time t2.

At time t7, charging control unit 82 resumes the charging of power storage device 4 and sets the level of signal S5 at the H level. In response to signal S5 at the H level, driving device 222 causes lamp 212 to illuminate.

Figure 6:
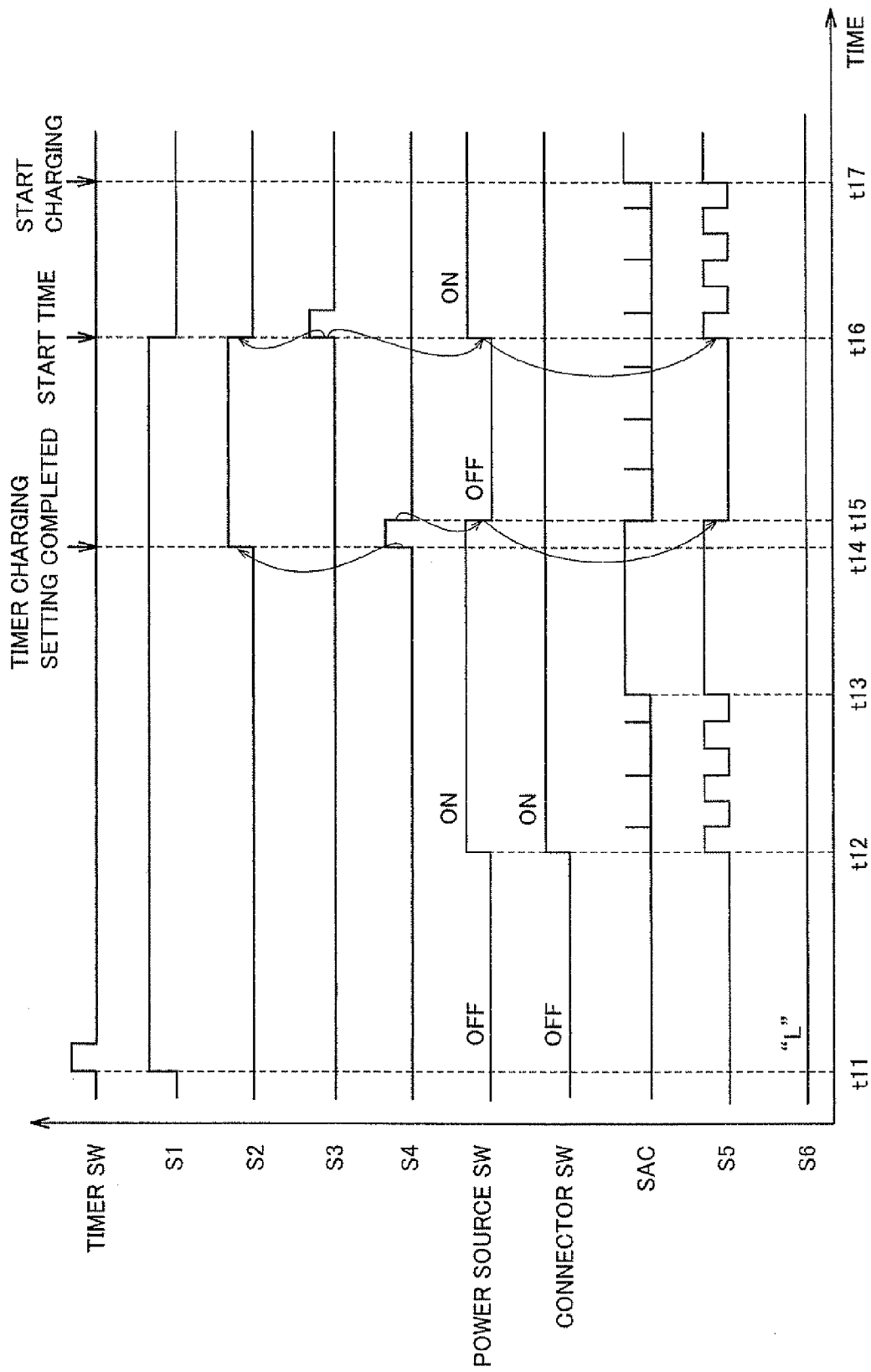
FIG. 6 is a second timing chart illustrating operations of electric power control unit 2 and timer control unit 3.

FIG. 6 is a second timing chart illustrating operations of electric power control unit 2 and timer control unit 3. FIG. 6 shows a flow of the timer charging process performed when the user first presses switch 61 and the charging cable is then connected to the charging connector.

Referring to FIG. 6, when the user presses switch 61 (timer SW) at time t11, signal S1 rises.

Next, at time t12, switch 62 (connector SW) is turned on. Namely, the charging cable is connected to charging connector 25. In response, determining unit 81 turns on switch 63 (power source SW). Accordingly, the electric power stored in auxiliary battery SB is supplied to charging control unit 82, thus starting up charging control unit 82.

Determining unit 81 receives signal SAC, determines a state of supply of electric power from external power source 240, and determines whether or not the timer charging can be permitted. When determining unit 81 determines that the supply of electric power from external power source 240 is normal (for example, external power source 240 is not in failure), it sends, at time t13, an instruction to charging control unit 82 in order to start up charging/discharging device 30. In response to the instruction, charging control unit 82 starts to control charging/discharging device 30. In this way, charging of power storage device 4 is started.

Charging control unit 82 repeatedly varies signal 85 during a period of time from time t12 to time t13. This causes lamp 212 to blink. After time t13, charging control unit 82 maintains the level of signal S5 at the H level. Accordingly, lamp 212 illuminates continuously.

While power storage device 4 is being charged, the level of signal SAC is maintained at the H level.

At time t14, in order to inform instructing unit 73 of permission of the timer charging, determining unit 81 changes the level of signal S4 from the L level to the H level. Processes performed by electric power control unit 2 and timer control unit 3 after time t14 are similar to the processes performed by electric power control unit 2 and timer control unit 3 after time t4, so explanation therefor is not repeated.

Figure 7:
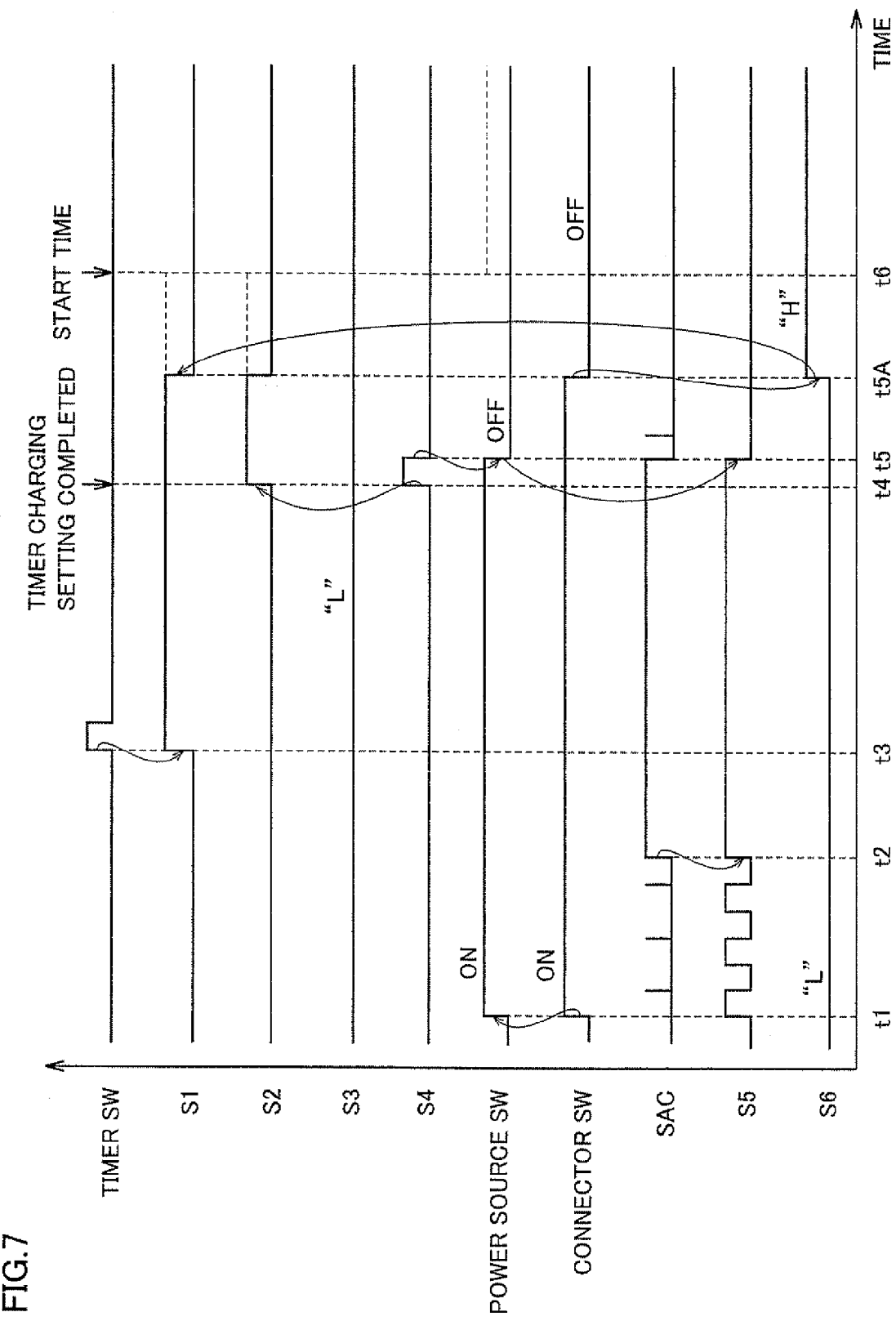
FIG. 7 is a timing chart illustrating operations of electric power control unit 2 and timer control unit 3 when a problem occurs in a charging system during a period of time from a moment of completion in setting timer charging to charging start time.

FIG. 7 is a timing chart illustrating operations performed by electric power control unit 2 and timer control unit 3 when an abnormality occurs in the charging system during a period of time from the moment of completion in setting the timer charging to the charging start time.

In FIG. 7, operations of electric power control unit 2 and timer control unit 3 before time t5 are similar to those of electric power control unit 2 and timer control unit 3 shown in FIG. 5. As one example of the abnormality in the charging system, FIG. 7 illustrates decoupling of the charging cable from the charging connector.

In this case, switch 62 (connector SW) becomes off at time t5A. At time t5 determining unit 81 detects that switch 62 has become off and changes the level of signal 56 from the L level to the H level.

When signal S6 becomes the H level, instructing unit 73 changes each of the levels of signals S1, S2 from the H level to the L level. Signal S1 at the L level represents that timer control unit 3 has canceled the request for the timer charging. In addition, signal 52 at the L level causes lamp 211 to be put out.

Further, at time t6 that is the charging start time, instructing unit 73 maintains the level of signal S3 at the L level. Namely, instructing unit 73 stops transmission of signal S3. Thus, determining unit 81 does not turn on switch 63 (power source SW). Accordingly, charging control unit 82 is not started up, so charging/discharging device 30 remains stopped. Thus, the power storage device is not charged.

Figure 8:
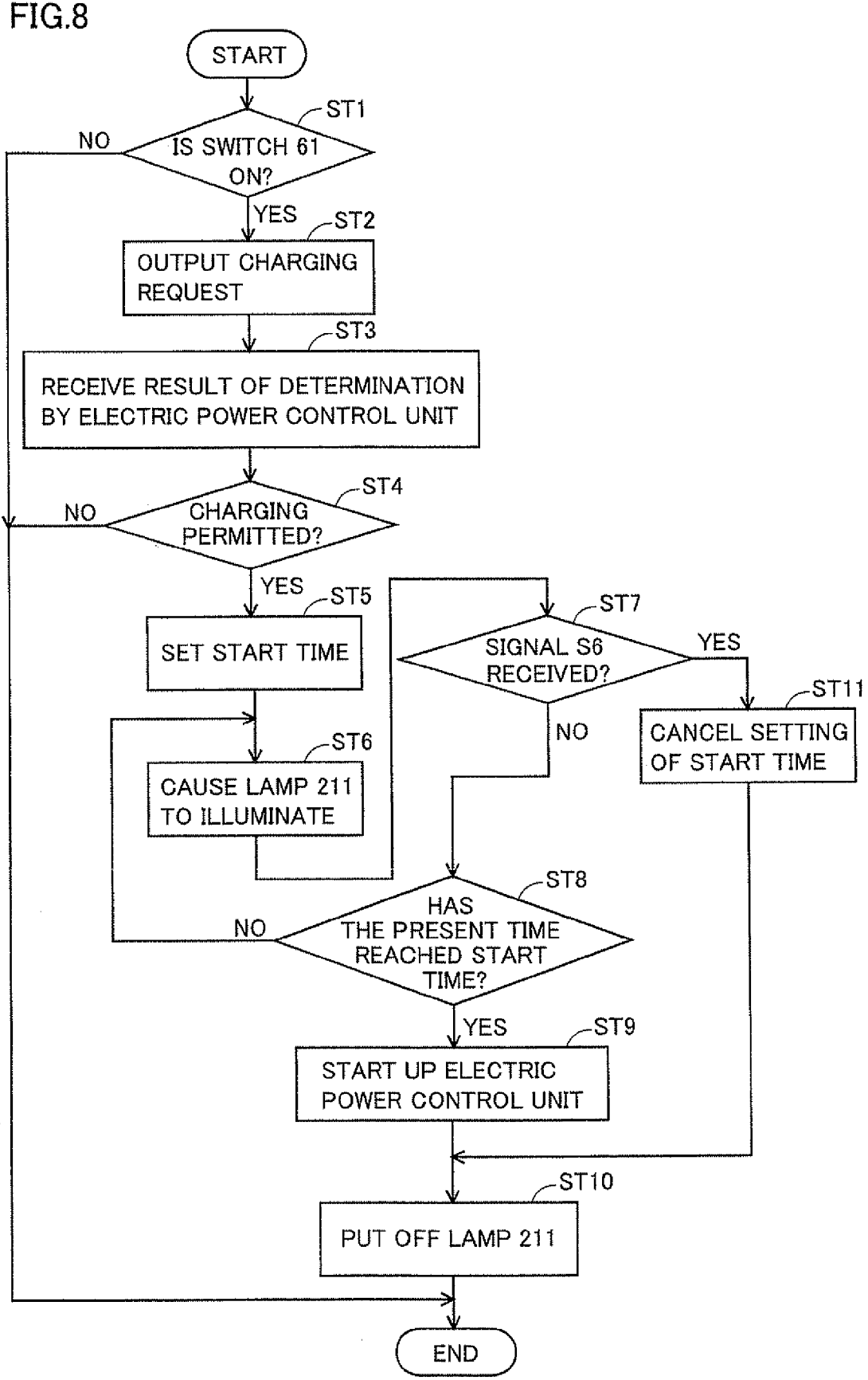
FIG. 8 is a flowchart illustrating a process performed by an instructing unit 73.

FIG. 8 is a flowchart illustrating a process performed by instructing unit 73. The process in the flowchart is called from a main routine and executed whenever a fixed period of time passes or a predetermined condition is satisfied.

Referring to FIG. 8 and FIG. 4, instructing unit 73 determines whether or not switch 61 has become on (step ST1). When switch 61 is in the off state (NO in step ST1), the process by instructing unit 73 is ended. When switch 61 has become on (YES in step ST1), instructing unit 73 outputs a timer charging request (signal S1) to determining unit 81.

Instructing unit 73 receives signal S4 which indicates the result of the determination as to permission for the charging by electric power control unit 2 (step ST3). Instructing unit 73 determines whether or not electric power control unit 2 has permitted the timer charging (step ST4). If the timer charging is not permitted (NO in step ST4), the process by instructing unit 73 is ended. If the timer charging is permitted (YES in step ST4), instructing unit 73 reads out the programmed start time recorded in storage unit 72 so as to set the charging start time (step ST5).

Next, instructing unit 73 transmits signal 52 shown in FIG. 6 to driving device 221 so as to cause lamp 211 to illuminate (step ST6).

Then, instructing unit 73 determines whether or not signal S6 has been received (step ST7). If signal S6 has not been received (NO in step ST7), instructing unit 73 performs a process of step ST8.

In step ST8, instructing unit 73 determines whether or not the present time has reached the charging start time. If the present time has not reached the charging start time (NO in step ST8), the process goes back to step ST6. If the present time has reached the charging start time (YES in step ST8), instructing unit 73 transmits signal S3 to electric power control unit 2 (determining unit 81) to start up electric power control unit 2 (step ST9). Further, instructing unit 73 causes driving device 221 to put out lamp 211 (step ST10).

If signal S6 has been received (YES in step ST7), instructing unit 73 performs a process of step ST11. In step ST11, instructing unit 73 cancels the setting of the charging start time. Then, instructing unit 73 causes driving device 221 to put out lamp 211 (step ST10).

When the process in step ST10 is ended, the entire process by instructing unit 73 is terminated.

Figure 9:
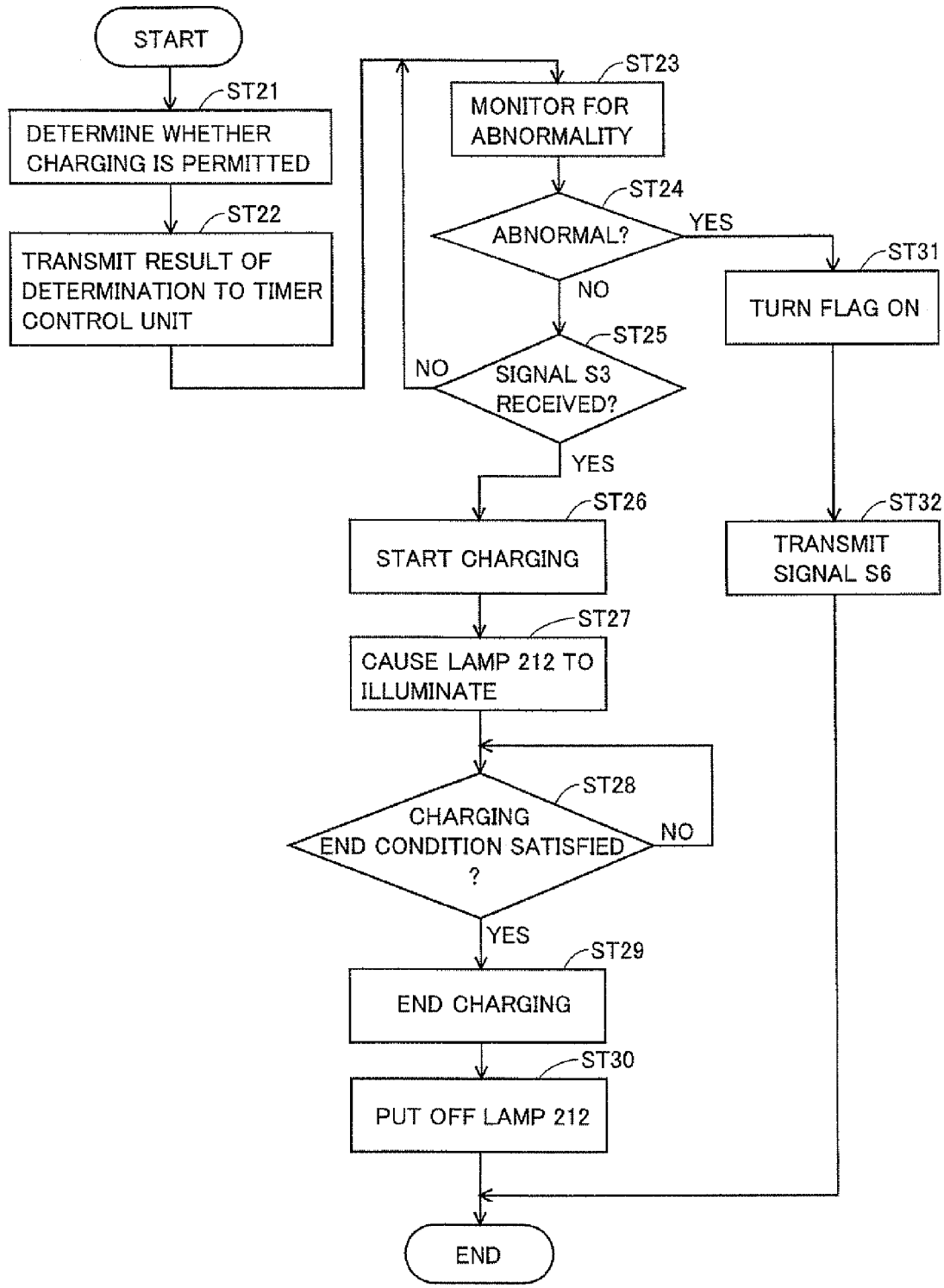
FIG. 9 is a flowchart illustrating a process performed by electric power control unit 2.

FIG. 9 is a flowchart illustrating a process performed by electric power control unit 2. The process in the flowchart is called from the main routine and executed whenever a fixed period of time passes or a predetermined condition is satisfied.

Referring to FIG. 9 and FIG. 4, in response to signal S1 representing the timer charging request, determining unit 81 determines whether or not the charging is permitted (step ST21). Specifically, determining unit 81 determines whether or not switch 62 is in the on state. Further, determining unit 81 receives signal SAC and determines whether or not alternating-current power has been delivered from external power source 240 to charging connector 25. If switch 62 is in the on state and the alternating-current power has been delivered from external power source 240 to charging connector 25, determining unit 81 transmits signal S4 indicating that the timer charging is permitted, to timer control unit 3 (instructing unit 73) (step ST22).

After transmitting signal S4, determining unit 81 turns off switch 63. This stops supply of electric power to charging control unit 82 and terminating unit 83. Determining unit 81 monitors for an abnormality in the charging system (step ST23). Specifically, for example, determining unit 81 checks, for every fixed period of time and in accordance with signal SAC, whether or not the external power source is in failure, or checks, based on a state of switch 62, whether or not the charging cable is decoupled from charging connector 25.

Based on the result of the monitoring in step ST23, determining unit 81 determines whether or not there is a problem in the charging system (step ST24). If determining unit 81 determines that there is an abnormality in the charging system (YES in step ST24), it turns on a flag stored therein (step ST31). In addition, determining unit 81 transmits signal S6 (step ST32). When the process in step ST32 is ended, the entire process is terminated.

On the other hand, if determining unit 81 determines in step ST24 that the charging system is normal (NO in step ST24), it determines whether or not signal S3 has been received (step ST25). If determining unit 81 has not received signal S3 (NO in step ST25), the process goes back to step ST23. If determining unit 81 has received signal S3 (YES in step ST25), the process goes to step ST26.

In step ST26, determining unit 81 turns on switch 63. Accordingly, the electric power stored in auxiliary battery SB is supplied to charging control unit 82 and terminating unit 83. Further, determining unit 81 instructs charging control unit 82 to start charging. Charging control unit 82 starts to control charging/discharging device 30. In this way, the charging of the power storage device is started (step ST26).

Furthermore, charging control unit 82 transmits signal S5 to driving device 222 so as to light up lamp 212 (step ST27).

Then, terminating unit 83 determines whether or not the charging end condition of the power storage device has been satisfied (step ST28). For example, charging control unit 82 calculates a value of a state of charge of the power storage device. When the value reaches a predetermined value (for example, 80%), terminating unit 83 determines that the charging end condition has been satisfied.

If the charging end condition is not satisfied (NO in step ST28), the process of step ST28 is repeated. On the other hand, if the charging end condition is satisfied (YES in step ST28), terminating unit 83 sends an instruction to charging control unit 82 so as to end the charging. Upon receiving the instruction, charging control unit 82 stops charging/discharging device 30. In this way, the charging of the power storage device is ended (step ST29). In addition, charging control unit 82 puts out lamp 212 (step ST30). When the process in step ST30 is ended, the entire process is terminated.

Figure 10:
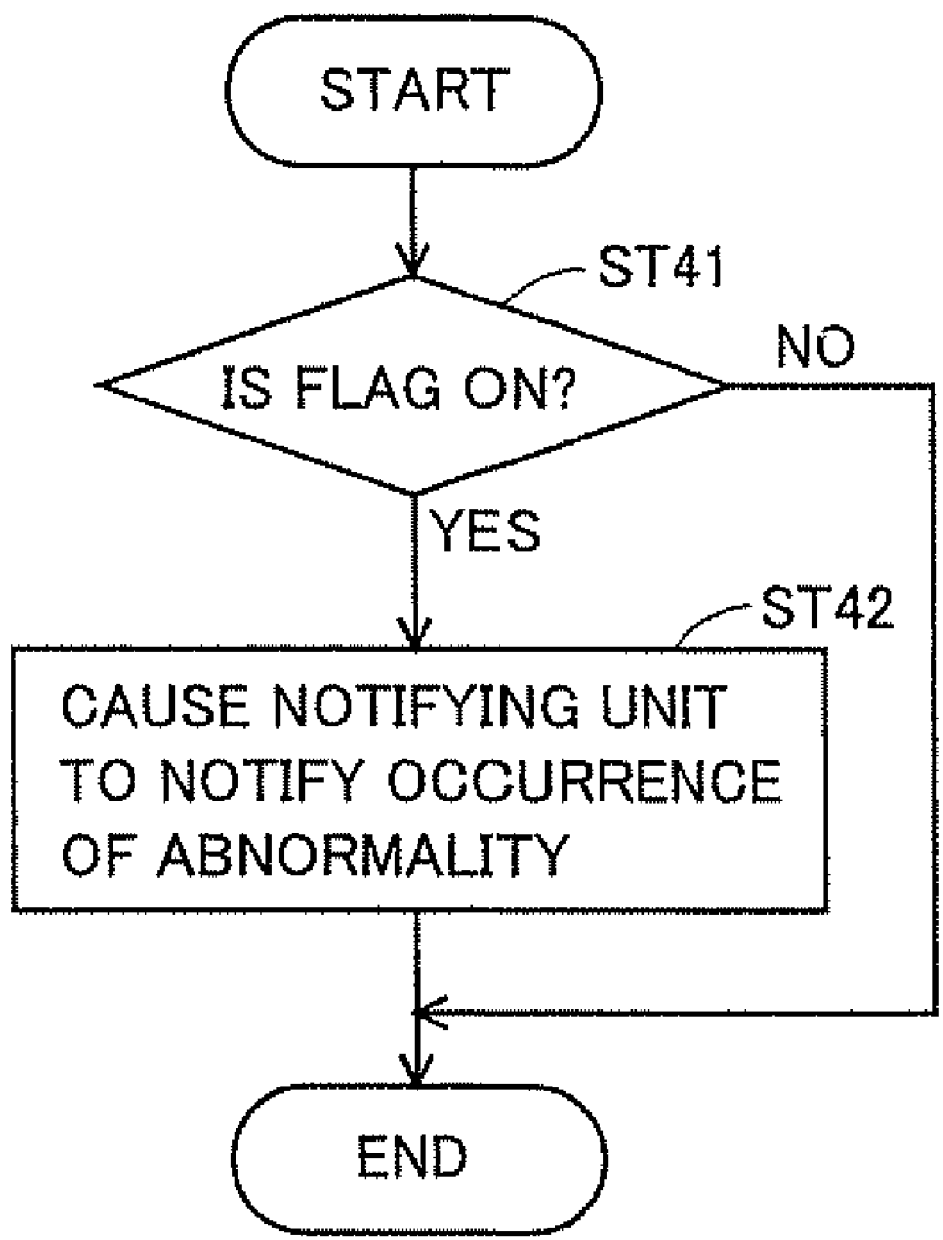
FIG. 10 is a flowchart illustrating a notifying process performed by a determining unit 81 and a notifying unit 90.

FIG. 10 is a flowchart illustrating a notifying process performed by determining unit 81 and notifying unit 90. Referring to FIG. 10, determining unit 81 determines whether or not the flag is on (step ST41). If the flag is not on (NO in step ST41), the entire process is terminated. If the flag is on (YES in step ST41), determining unit 81 sends an instruction to notifying unit 90. Upon receiving the instruction, notifying unit 90 performs a process to notify the user of occurrence of an abnormality (step ST42).

The process in the flowchart of FIG. 10 is called from the main routine and executed whenever a fixed period of time passes from the moment of completion in setting the timer charging. Accordingly, when an abnormality occurs in the charging system, notification can be made in a short time from the moment of occurrence of the abnormality. Accordingly, the user can be notified of the abnormality in the charging system quickly.

At the moment of occurrence of an abnormality in the charging system, the user may not be around the vehicle. To securely notify the user of occurrence of an abnormality in the charging system, the problem can be notified, for example, while the user is likely to be in the surroundings of the vehicle (or within the vehicle). A notifying process for this will be described with reference to FIG. 11. A flowchart of FIG. 11 is different from that of FIG. 10 in that a process of step ST41A is added.

Figure 11:
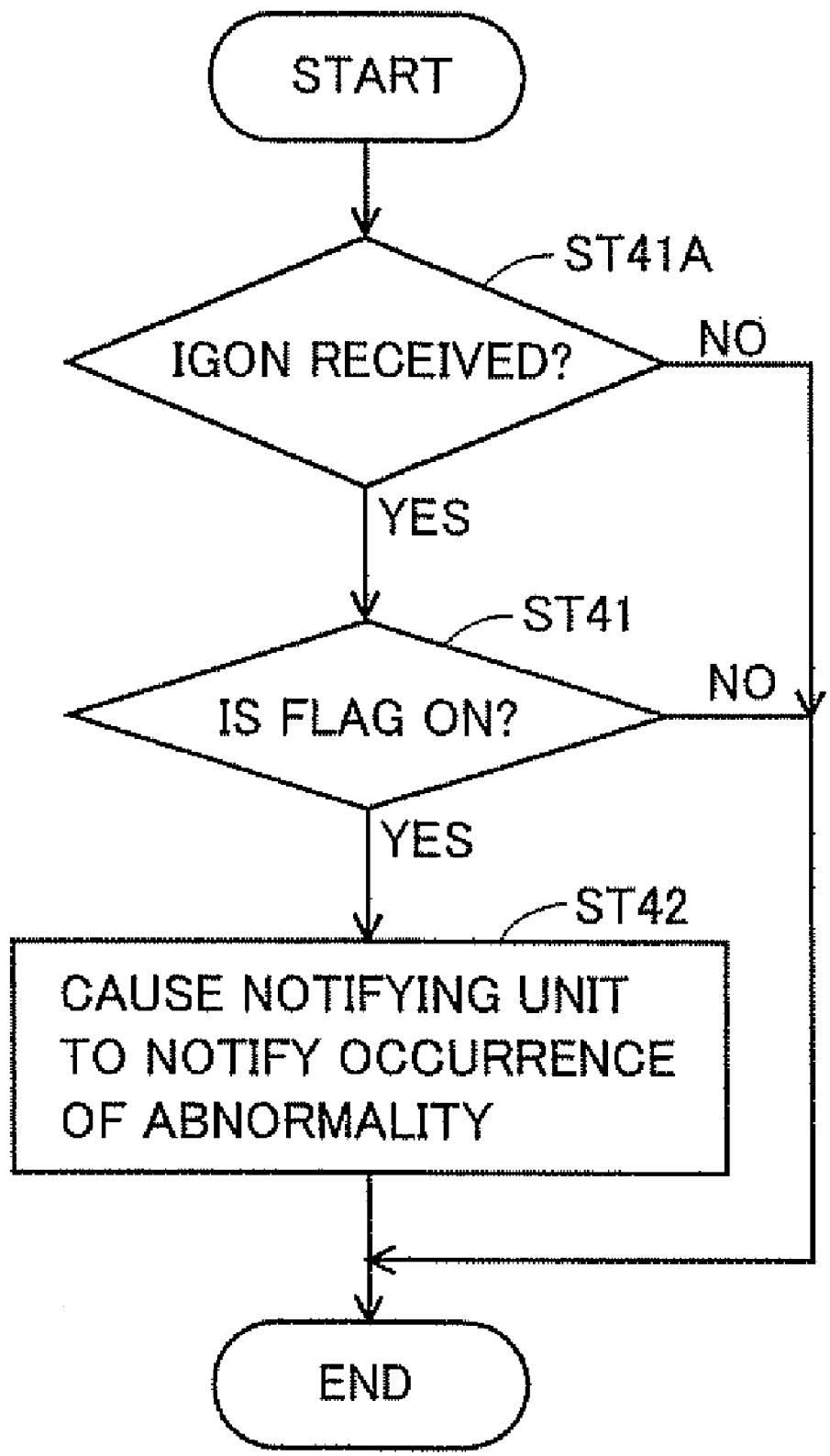
FIG. 11 is a flowchart illustrating another notifying process performed by determining unit 81 and notifying unit 90.

Referring to FIG. 11 and FIG. 4, determining unit 81 determines whether or not a signal IGON (see FIG. 4) representing an instruction for starting vehicle 100 has been received (step ST41A). It should be noted that signal IGON is sent from the external ECU to determining unit 81 when the user instructs the vehicle to start (for example, the user turns on a switch for starting the vehicle).

If determining unit 81 has not received signal IGON (NO in step ST41A), the entire process is terminated. If determining unit 81 has received signal IGON (YES in step ST41A), it performs the process of step ST41 (determines whether or not flag FLG is on). The processes after step ST41 are similar to those in the flowchart of FIG. 10.

As described above, signal IGON is input to determining unit 81 by the user when he/she operates to start the vehicle. Thus, according to the processes in the flowchart of FIG. 11, the user can know occurrence of a problem in the charging system more securely.

Note that in the present embodiment, the determining unit is included in the electric power control unit. However, the determining unit may be included in the timer control unit. Note also that the timer control unit and the electric power control unit may be integrated.

As an example of a hybrid vehicle that can be charged by an external power source, FIG. 2 shows the series/parallel type hybrid system in which motive power of the engine can be split for the axle and the electric power generator by the power splitting mechanism and can be transmitted thereto. However, the present invention is applicable to a parallel type hybrid vehicle and a series type hybrid vehicle.

Further, in the present embodiment, it is assumed that the user inputs charging start time (programmed start time). However, the user may input programmed end time to setting unit 71. In this case, setting unit 71 sets, for example, charging start time at time coming before the programmed end time by a predetermined period of time. It should be noted that a way in which setting unit 71 sets the charging start time based on the programmed end time is not limited to this.

Further, the configuration for externally charging power storage device 4 is not limited to the configuration of each of FIG. 2 and FIG. 3. For example, in the case where power storage device 4 is charged using alternating-current power such as one from a commercial electric power source, a rectifier device and an inverter device may be provided outside the vehicle to convert the alternating-current power into direct-current power. In this case, the power storage device can be directly charged by the direct-current power supplied from outside the vehicle.

It should be considered that the embodiments disclosed herein are illustrative and non-restrictive in any respect. The scope of the present invention is defined by the scope of claims rather than the description above, and is intended to include any modifications within the scope and meaning equivalent to the terms of the claims.

The invention claimed is:

1. An electrically powered vehicle capable of being charged by an external power source, comprising:
   a first power storage device for storing electric power used to generate driving force of said electrically powered vehicle;
   a second power storage device for storing electric power from said first power storage device;
   a charging device for charging said first power storage device by using electric power supplied from said external power source;
   a start time setting unit for receiving at least one of programmed start time and programmed end time, and for setting charging start time;
   a start instructing unit for outputting a start instruction to start to charge said first power storage device, when the present time reaches said charging start time set by said start time setting unit;
   a charging control unit for starting up said charging device in response to supply of electric power; and
   an abnormality monitoring unit for monitoring an abnormality in said charging device when the startup of said charging device at said charging start time has been set, during a period of time from a moment at which the startup of said charging device at said charging start time has been set, to said charging start time, and for causing said start instructing unit to stop the output of said start instruction when a problem is detected in said charging device,
   said abnormality monitoring unit interrupting supply of electric power from said second power storage device to said charging control unit after completion in setting the startup of said charging device, so as to stop said charging control unit, and when there is detected no abnormality in said charging device, said abnormality monitoring unit allowing supply of electric power from said second power storage device to said charging control unit in response to said start instruction so as to start up said charging control unit.

2. The electrically powered vehicle according to claim 1, wherein when the startup of said charging device at said charging start time is instructed, said start instructing unit causes said abnormality monitoring unit to determine whether or not supply of the electric power from said external power source to said charging device is normal, and when said abnormality monitoring unit determines that said supply of the electric power is normal, said start instructing unit starts determination as to whether or not the present time has reached said charging start time.

3. The electrically powered vehicle according to claim 1, further comprising a notifying unit for notifying the abnormality in said charging device, wherein
   when said abnormality monitoring unit detects the abnormality in said charging device, said abnormality monitoring unit causes said notifying unit to notify the abnormality in said charging device.

4. The electrically powered vehicle according to claim 1, further comprising a notifying unit for notifying the abnormality in said charging device, wherein
   when said abnormality monitoring unit detects the abnormality in said charging device, said abnormality monitoring unit causes said notifying unit to notify the abnormality in said charging device in response to startup of said electrically powered vehicle.

* * * * *